United States Patent
Ledet

(10) Patent No.: US 10,088,328 B1
(45) Date of Patent: Oct. 2, 2018

(54) NAVIGATION APPLICATION PROVIDING SUPPLEMENTAL NAVIGATION INFORMATION

(71) Applicant: OPEN INVENTION NETWORK LLC, Durham, NC (US)

(72) Inventor: David Gerard Ledet, Allen, TX (US)

(73) Assignee: Open Invention Network LLC, Durham, NC (US)

( * ) Notice: Subject to any disclaimer, the term of this patent is extended or adjusted under 35 U.S.C. 154(b) by 94 days.

(21) Appl. No.: 15/397,922

(22) Filed: Jan. 4, 2017

Related U.S. Application Data

(60) Provisional application No. 62/275,124, filed on Jan. 5, 2016.

(51) Int. Cl.
| | |
|---|---|
| *G01C 21/36* | (2006.01) |
| *G02B 27/01* | (2006.01) |
| *G03H 3/00* | (2006.01) |
| *G03H 1/08* | (2006.01) |
| *G03H 1/22* | (2006.01) |
| *G03H 1/00* | (2006.01) |
| *G01S 19/13* | (2010.01) |

(52) U.S. Cl.
CPC ....... *G01C 21/3635* (2013.01); *G01C 21/365* (2013.01); *G01C 21/367* (2013.01); *G01C 21/3629* (2013.01); *G02B 27/0103* (2013.01); *G03H 1/0005* (2013.01); *G03H 1/08* (2013.01); *G03H 1/2249* (2013.01); *G03H 3/00* (2013.01); *G01S 19/13* (2013.01); *G02B 2027/0141* (2013.01)

(58) Field of Classification Search
None
See application file for complete search history.

(56) References Cited

U.S. PATENT DOCUMENTS

| | | | |
|---|---|---|---|
| 9,965,034 B2 * | 5/2018 | Levesque ................ | G06F 3/016 |
| 2014/0267035 A1 * | 9/2014 | Schalk .................... | G06F 3/017 |
| | | | 345/158 |

FOREIGN PATENT DOCUMENTS

WO   WO-2016007920 A1 *   1/2016   ............. G06F 3/016

OTHER PUBLICATIONS

Marzo et al., "Holographic Acoustic Elements for Manipulation of Levitated Objects", Nature Communications, vol. 6 No. 8661, Oct. 2015, pp. 1-7. (Year: 2015).*

* cited by examiner

*Primary Examiner* — Todd M Melton

(57) ABSTRACT

Navigation applications may utilize various input data to determine various navigation routes. One example method of operating may include providing at least one navigation instruction to a navigation device via a navigation application, detecting the at least one instruction via a detection application, obtaining an image of a physical object, performing a holo-acoustic object manipulation of the physical object, and providing a visual display of the holo-acoustic manipulation as an additional navigation instruction.

20 Claims, 15 Drawing Sheets

350

```
var map;
var service;
var infowindow;

function initialize() {
  var pyrmont = new google.maps.LatLng(-33.8665433,151.1956316);

map = new google.maps.Map(document.getElementById('map'), {
      center: pyrmont,
      zoom: 15
    });

var request = {
    location: pyrmont,
    radius: '500',
    types: ['store']
  };

service = new google.maps.places.PlacesService(map);
  service.nearbySearch(request, callback);
} function callback(results, status) {
  if (status == google.maps.places.PlacesServiceStatus.OK) {
    for (var i = 0; i < results.length; i++) {
      var place = results[i];
      createMarker(results[i]);
    }
  }
}
```

```
var map;
var service;
var infowindow;
function initialize() {
    var leg = service.getCurrentLeg();
    var step = service.getCurrentStep(leg);

var pyrmont = new google.maps.LatLng(step.end_location.lat,
                            step.end_location.lng);

map = new google.maps.Map(document.getElementById('map'), {
        center: pyrmont,
        zoom: 15
      });

var request = {
       location: pyrmont,
       radius: '80',
       types: ['store']
     };

service = new google.maps.places.PlacesService(map);
     service.nearbySearch(request, callback);
} function callback(results, status) {
    if (status == google.maps.places.PlacesServiceStatus.OK) {
        var place = results[0];
        notification(speechToText(
                'Look for the business',place,'at the intersection'));
    }
}
```

FIG. 4

NAVIGATION APPLICATION PROVIDING SUPPLEMENTAL NAVIGATION INFORMATION

CROSS-REFERENCE TO RELATED APPLICATIONS

This application claims priority to earlier filed provisional patent application No. 62/275,124 entitled "NAVIGATION", which was filed on Jan. 5, 2016, the entire contents of which are hereby incorporated by reference.

TECHNICAL FIELD OF THE APPLICATION

This application relates to monitored navigation and more specifically to utilizing predetermined information to create navigation routes and to provide options and assistance to user devices during a navigation session.

BACKGROUND OF THE APPLICATION

There are numerous applications and devices which may be used to offer navigation assistance to users operating transport vehicles. Those devices are quite similar in that the destination is identified and the route is planned to assist the user with ensuring they maintain their route on the fastest and most available roads by avoiding traffic, smaller less common roads, etc. Some of the applications even offer updated traffic information and assistance with locating gas stations, restaurants, etc.

However, the limits on navigation tools are evident in that the goal is always to stay on course and not deviate during a navigation session. In reality, users are often traveling with a perspective on their surroundings that is beyond the exact instructions provided by a navigation route.

SUMMARY OF THE APPLICATION

One example embodiment may provide a method that includes at least one of providing at least one navigation instruction to a navigation device via a navigation application, detecting the at least one instruction via a detection application, and providing at least one additional navigation instruction comprising additional information related to the first navigation instructions via the detection application.

Another example embodiment may include an apparatus that includes a receiver configured to receive at least one navigation instruction at a navigation device via a navigation application, and a processor configured to detect the at least one instruction via a detection application, and the receiver is further configured to receive at least one additional navigation instruction comprising additional information related to the first navigation instructions via the detection application.

Yet another example embodiment may include a non-transitory computer readable storage medium configured to store instructions that when executed causes a processor to perform providing at least one navigation instruction to a navigation device via a navigation application, detecting the at least one instruction via a detection application, and providing at least one additional navigation instruction comprising additional information related to the first navigation instructions via the detection application.

Still another example embodiment may include a method that includes providing at least one navigation instruction to a navigation device via a navigation application, detecting the at least one instruction via a detection application, obtaining an image of a physical object, performing a holo-acoustic object manipulation of the physical object, and providing a visual display of the holo-acoustic manipulation as an additional navigation instruction.

Still yet another example embodiment may include an apparatus that includes a processor configured to provide at least one navigation instruction to a navigation device via a navigation application, detect the at least one instruction via a detection application, obtain an image of a physical object, perform a holo-acoustic object manipulation of the physical object, and provide a visual display of the holo-acoustic manipulation as an additional navigation instruction.

Still yet a further example embodiment may include a non-transitory computer readable storage medium configured to store instructions that when executed causes a processor to perform providing at least one navigation instruction to a navigation device via a navigation application, detecting the at least one instruction via a detection application, obtaining an image of a physical object, performing a holo-acoustic object manipulation of the physical object, and providing a visual display of the holo-acoustic manipulation as an additional navigation instruction.

BRIEF DESCRIPTION OF THE DRAWINGS

FIG. 3 illustrates an example of code used to obtain business information for a particular location according to example embodiments.

FIG. 4 illustrates another example of code used to obtain business information for a particular location according to example embodiments.

DETAILED DESCRIPTION OF THE APPLICATION

Figure 1:
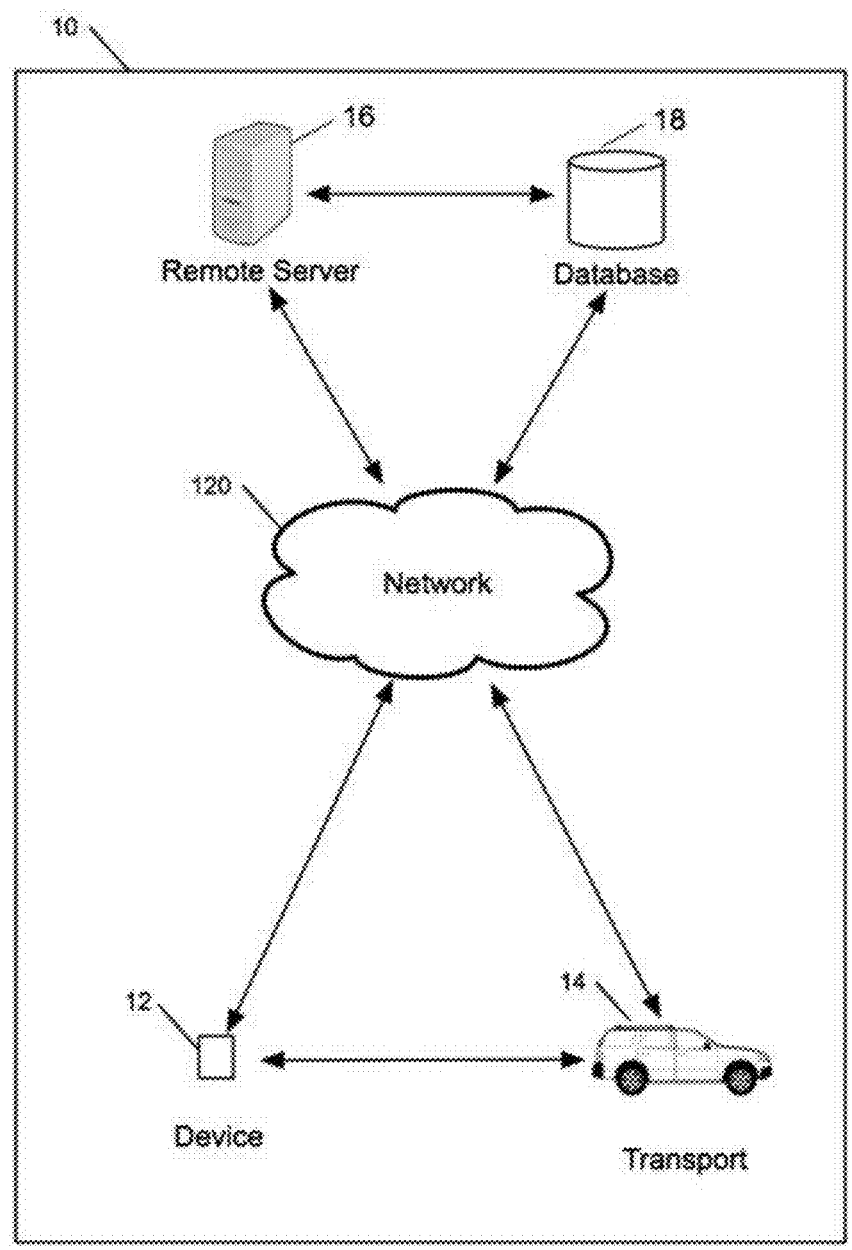
FIG. 1 illustrates a network diagram of a client device operating with a navigation application configuration according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide applications for navigation along a particular travel route, and more specifically determining intermediate destinations on the route to a final destination based on various characteristics of one or more users in a transport, such as a moving vehicle or other moving device configuration capable of offering a traveling service.

Other examples include an enhancement to navigation functionality, and more specifically enhancements to a navigation application that assists the user in navigating to a destination. There are at least two levels of assistance provided in the current disclosure. The first level of assistance adds additional navigational elements that are complementary to the normal navigation clues identified by a navigation application.

The second level of assistance offers the ability for the current application to functionally interwork with the navigation application providing additional assistance to the user when navigating to a destination. Also provided are holovisual and thermal representations permitting for alternate displays so the user may obtain further data regarding the transport and/or current navigation. One or more of these levels can be used in conjunction with one another and/or contemporaneously so the functionality of one can be integrated with another.

The characteristics of the user may include one or more of acquaintances of the user as determined by the user's communication with others (i.e., emails, chat messages, etc.), interests as determined by examining the user's group membership(s), search history, purchase history, locations/stores visited, advertisements interacted with, and/or social network affiliations, etc. Also, user desires as determined by search history, items purchased, advertisements interacted with by a user profile, communication with others, etc., may be identified and used as data input parameters to offer a user options during a navigation session. Also, other characteristics of the user may be obtained via searching through the user's locally and remotely stored data.

The characteristics of the user may be determined by the application/program/software of the current application through analysis of local and remote systems. In another example of the current application, determinations are made via a processing entity to examine items that may be of interest to a user profile based on certain criteria. Example criterion may be the lowest price, for example, of gasoline along a particular route. An 'item' may be a non-final destination along a route in a transport and the non-final destination may be a business location on the route or near the route as part of an alternative route which offers fuel, a tourist attraction, a store, or any other similar location that is deemed potentially desirable to one or more of the users affiliated with the current route.

The current application also includes navigation along a route, and more specifically determining multiple routes to a destination and where those multiple routes may include destination(s) that are reflected in a user's characteristics. Those alternate routes may be depicted differently on a map. For example, colors of the route may indicate the user's level of interest. Furthermore, each of the alternate routes may be interacted with where details of that particular route are displayed along with the additional time it will take for the user to travel to that alternate route. The data pertaining to the rationale that the alternate route was selected may also be included in the data. The current application also may seek to notify other users of the alternate selected route when the application determines that the other users may also have an interest in that destination.

FIG. 1 displays a system diagram configuration 10 which may be used to provide data services to a transport during a navigation session according to example embodiments. The present application, in the form of software, for example, executes on a device 12, or is accessible by the device 12 via a different device (not shown) in a network 120 and/or a device communicably coupled to the network, such as a server 16 and/or database 18. The device 12 is referred to as a device capable of providing services to a first application. The device 12 may be a mobile device, a tablet computer, a laptop or desktop computer, a transport navigational computer, a wearable device, or any other similar or dissimilar device containing a processor and memory. The device may also be a gaming system, a DVD player, or any device that is normally utilized to consume media.

The application, such as in the form of software, for example, may reside on the device 12 that may be any of the above example devices or a mobile laptop device and/or a personal desktop computer or a mobile phone device or any other device containing a processor and memory. The device may be connected to the network 120, which may be the Internet or any other type of network. The device 12 may communicate with the network 120 and/or a transport 14 and the transport contains an internal device, such as a navigational system device 13, with a processor and memory, which may be used to provide navigation via an interface, which may be visual and/or audio in nature. The application executing on or within the transport 14 is henceforth referred to as the second application. The device 12 alternately may also operate within the transport 14.

The transport 14 may be a car, bus, train, motorcycle, airplane or any other type of moveable object normally used to transport human beings and/or objects. For example, the transport may be utilized to move people, objects such as goods or packages, or people and objects. The communication between the device 12 and remote elements (the network 120 and/or the transport 14) may be wired and/or wireless and occur through many types of communication protocols such as cellular, Bluetooth, Wi-Fi, or any other types of communication protocol permitting communication between computing devices at a short and/or long distance. The current application residing on the device 12, in the form of software, for example, or for use by the device 12 may be downloaded from the remote server 16 through the network 120.

The user of the application may interface with the device 12 and/or the transport 14 and connect through the network 120 to the remote server 16, which may be redundant, or be more than a single entity without deviating from the scope of the application. A database 18 may directly or indirectly connect to the remote server or connect remotely through the network 120 without deviating from the scope of the application.

The software application of the instant application (not shown) resides completely or partially on the device 12, which may be a mobile device and/or completely or partially on the transport 14, but may also reside on a user's desktop computer, a personal digital assistant (PDA), tablet computer, or any other device containing a processor, memory, and an operating system. In addition, the application may reside on either completely or partially on any one of the other elements in the system depicted in FIG. 1.

In one example embodiment, the current application seeks to alter navigation of a user traveling along a route via a transport 14. A device 12 is utilized in the current application and the current application may be executing on the device. The device 12 may be carried by the user, such as a mobile device that the user may be carrying, or the device may be part of the transport 14 such that the device may display notifications to the user through audio, images, video, etc.

The device may determine intermediate destinations which are displayed on the user device interface through notifications from the device whether the device is a mobile device or a device that may be on the transport 14. The current application utilizes user profile characteristics compiled and stored in a user profile when determining aspects of the functionality. As a result, the functionality surrounding the determination of the user's characteristics may include various logging and storing operations necessary to compile a user profile which can provide information necessary to enact a suggested set of options during an active navigation session.

The navigation application includes a configuration module that permits a user to configure particular elements of the application. This configuration module permits the user to specify actions taken by the application and also permits the user to specify certain actions. The configuration module also permits particular elements in the application to be configured by the user. The configuration module may be software residing in the client device 12, the navigation application 14, or any other element in the network architecture containing a processor and memory.

The device 12 may communicate with the network 120 and/or a transport 14 wherein the transport contains an internal device, such as a navigational system, with a processor and memory, which may be used to provide navigation via an interface, which may be visual and/or audio in nature. The application executing on a transport 14 is henceforth referred to as the second application. The device 12 alternately may operate within the transport 14. The current application executing on the device 12 and referred to as the first application may provide additional layered assistance to a mapping application executing on or within a transport 14, for example, a global positioning satellite (GPS) application, which may be referred to as a second application. The first application can execute on the device 12 and the second application can execute on the transport 14, such as a navigation system (not shown), in the transport 14. GPS functionality can be contained on one or more of the elements in the system 10.

The first application and the second application may synchronize with one another. For example, one application may provide audio based content, such as directions, while the other application, may receive input from the one application and append additional audio-based content to the provided audio content. These provided and/or appended audio content may also be converted to text via speech-to-text algorithms which are widely available today such that the converted text is analyzed by an application and processed accordingly. The speech-to-text functionality may operate in the client device 12.

In another example, the text may be appended to the textual directions of the second application. For instance, there is a connection with the first and second applications via an application programming interface (API), and the details of the overall navigation and the specific and immediate progress of the transport through the navigation can be determined shared and/or updated. In another example, both of the above processes may be utilized to connect the first application and the second application's functionality. Other "connections" between the first application and the second application's functionality may also be utilized without deviating from the scope of the current application. In another example, the full functionality of the navigation depicted may exist entirely in the first application or the second application without deviating from the scope of the current application.

For the first level of assistance, the first application seeks to provide additional navigational assistance by adding additional navigational data that aid the user. The second application may provide a visual clue for an upcoming turn. For example, if the second application provides speech that tells the user: "In 1000 feet, turn right onto Denny Street." The first application may then provide speech that tells the user: "There is a Chevron business on the corner." As a result, a user, who may be a passenger in the transport would hear: "In 1000 feet, turn right onto Denny Street, there is a Chevron business on the corner." This permits the user to receive visual clues from the navigation device or other peripheral devices for the upcoming turn and not require the user to seek out a street sign for validation of the correct intersection.

Figure 2:
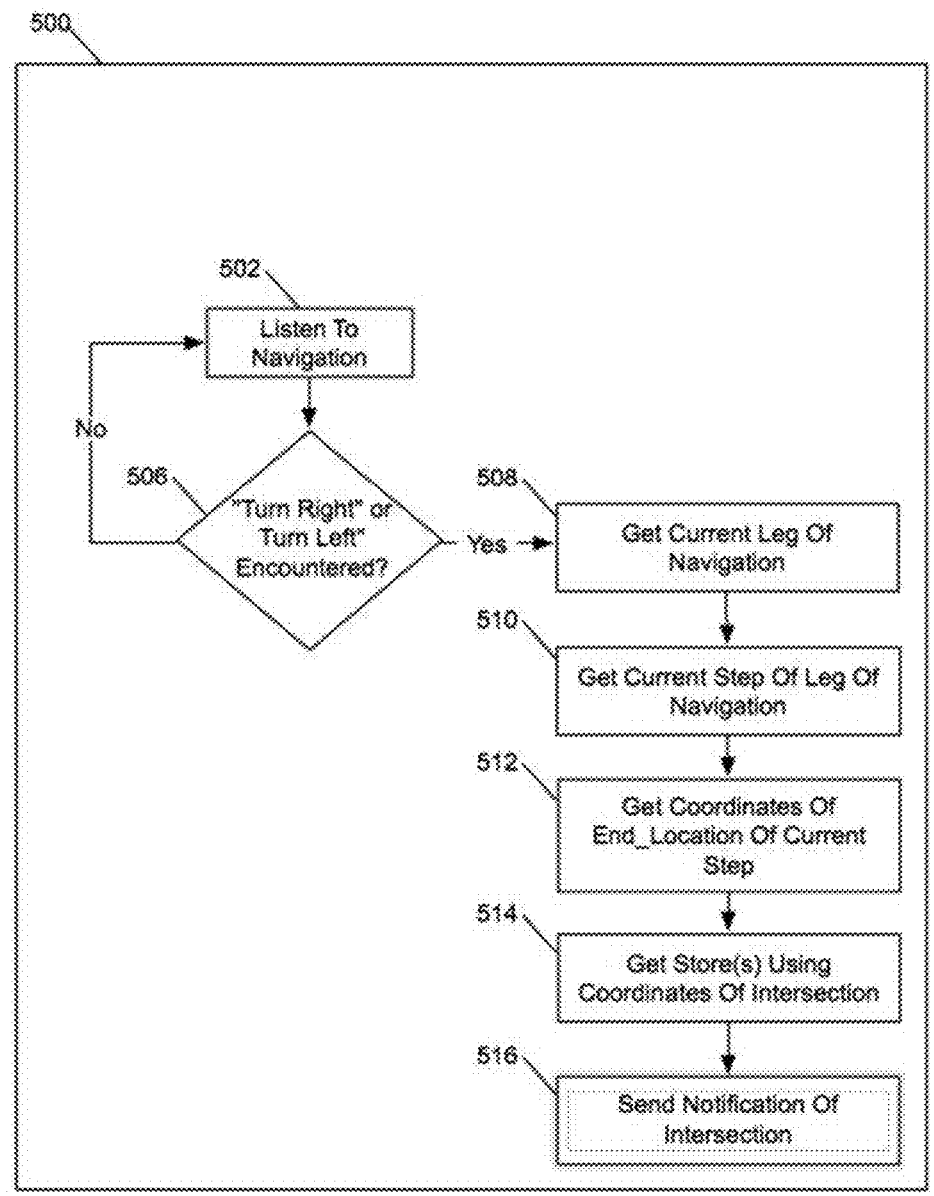
FIG. 2 illustrates a logic flow diagram of a navigation route and corresponding intersection information according to example embodiments.

FIG. 2 illustrates a logic flow of notifying a device of locations, for example, businesses or stores at an upcoming intersection 500. Referring to FIG. 2, the first application receives audio from the environment using the device's 12 microphone 502 and the environment may contain a navigation announcement from a second application, for example, a navigation application or the second application. Additionally, the first application is also tracking the transport through the navigation route and the first application has connected with the second application and has obtained the destination. The first application is expecting an audio navigation clue as it has also calculated a proposed route to the destination using the device's global position satellite (GPS) functionality normally used to calculate a route to a destination.

Continuing with the same example, the first application executing on the device 12 may receive the route from the navigation application executing on the transport 14 through either a direct connection, such that the applications are the same application, or from APIs that are exposed by the second application. If the first application is not the same application as the second application, the first application may obtain the current route details through access to the second application's exposed API. In another example, the first application may calculate a route to the final destination and after receiving the route from the exposed APIs of the second application, may then compare the current route to the received route from the second application and verify that the routes to the final destination match. The received data, for example, navigational audio, is searched to match a particular phrase (for example "Turn Left" or "Turn Right" 506). If that data is not matched, then the process loops back to the beginning, listening to the audio from the environment.

In another example, other phrases may be matched by the current application executing on the user's device 12, for example: "turn", "merge", etc. If the data is matched, the current leg of the navigation is obtained 508. The navigation data is obtained by either the first application having the destination of the user, or by obtaining the navigation data from execution of procedures on an API of the second application. Each element in the navigation legs array specifies a single leg of the journey/navigation from the origin to the destination in the calculated route. For routes that define one or more waypoints (i.e. stops/destinations), the route will include one or more legs, corresponding to the specific legs of the journey. Each leg within the legs field(s) may contain the following fields: Steps—contains an array of steps denoting information about each separate step of the leg of the journey; Distance—indicates the total distance covered by this leg, as a field with the following elements: 'Value'—indicates the distance in meters; 'Text'—contains a human-readable representation of the distance, displayed in units as used at the origin or as overridden within the units parameter in the request. For example, miles and feet will be used for any origin within the United States. Note that regardless of what unit system is displayed as text, the distance value contains a value expressed in meters. Additionally, 'Duration'—indicates the total duration of this leg, as a field with the following elements: 'Value'—indicates the duration in seconds; 'Text'—contains a human-readable representation of the duration; 'Start location'—contains the latitude/longitude coordinates of the origin of this navigation leg. Because the directions API calculates directions between locations by using the nearest transportation option, such as a road at the start and end points, 'Start location' may be different than the provided origin of the current navigation leg, for example, when a road is not near the origin. Also, 'End_location'—contains the latitude/longitude coordinates of a given destination of the current navigation leg. Because the GOOGLE MAPS directions API calculates directions between locations by using the nearest transportation option, such as a road, at the start and end points, 'End_location' may be different than the provided destination of the current leg, for example, when a road is not near the destination.

Once the current leg of the navigation is obtained, the current step is obtained 510, using the current leg of the navigation obtained in step 508. This is the operation where the user is currently located within the navigation and may correspond to the current step related to the spoken navigation announced in step 502. Each element in the steps array defines a single step of the calculated directions. A step is the most fundamental unit of a direction's route, containing a single step describing a specific/single instruction on the journey. The step not only describes the instruction but also contains distance and duration information relating to how this step relates to the following step. For example, "Turn right in 800 feet". Each step within the steps field(s) may contain the following fields: HTML_instructions—contains formatted instructions for this step, presented as an HTML text string, 'Distance'—contains the distance covered by this step until the next step, this field may be undefined if the distance is unknown. 'Duration'—contains the typical time required to perform the step, until the next step, this field may be undefined if the duration is unknown. 'Start_location'—contains the location of the starting point of this step, as a single set of latitude and longitude fields. 'End_location'—contains the location of the last point of this step, as a single set of latitude and longitude fields. Polyline'—contains a single point's object that holds an encoded polyline representation of the step. The Polyline' is an approximate (smoothed) path of the step. 'Steps' contains detailed directions for walking or driving steps in transit directions. Substeps' are only available when 'travel_mode' is set to "transit". The inner steps array is of the same type as steps. 'Transit_details' contains transit specific information. This field is only returned when 'travel_mode' is set to "transit". The coordinates of where the current step ends are located in the fields "End_Location" of the steps array 512. A call is made, for example, to "nearbySearch" to obtain the store(s) located at the intersection at the coordinates of the 'End_Location' of the current step 514.

A notification is sent to the first application and the user is notified via the notification, for example, via an announcement via audio, text, or an update to a graphical user interface (GUI), informing the user to look for the obtained store at the upcoming intersection, which is the 'End_location' of the current step 516. For example, "Look for the Chevron at the intersection". The notification may be spoken voice from the device and the text generated in step 516 is output via a microphone on the device 12. In another example, the spoken voice from the first application on device 12 is most closely matched to the voice of the second application. Using application such as DRAGON Naturally-Speaking, it is possible to process received speech and determine qualities of the speech. Through this or similar functionality, the first application most closely matches the gender and other qualities of the normal navigation speech of the second application, and merges the voice from the second application's speech and the speech generated by the first application.

An example of the software included in the application is provided to relate the possible programming to implement the depicted logic. The current code of FIG. 3 is a revised version of a GOOGLE MAPS location API implementation permitting the reader to gain an understanding of one possible functional implementation. As a first exercise, the base logic is presented as an implementation of the current application. This code, for example, is JAVASCRIPT and as an example places markers, or visual icons on the user's map for stores located in a 500 meter radius of a given coordinate. The code is described briefly, only to one skilled in the art understand the software used to build the current application. The described software resides in the current application, which may reside on the device 12 and/or the transport 14.

FIG. 3 illustrates JAVASCRIPT code 350 that obtains nearby stores given a particular location. In the code example, the initialize( ) function is executed upon instantiation of the object where the code resides. The initialize function obtains a static location as indicated by the provided latitude and longitude coordinates, and stores the location into a local variable "pyrmont". A request variable is established and is used as a parameter for the upcoming function nearbySearch( ) The request contains the previously determined location (pyrmont), the radius of the search (500), and the type of element to search for (store). A nearby search permits a user to search for places within a specified area by keyword or type input. A nearby search includes a location, which can be specified in one of two ways: a 'LatLngBounds' or a circular area defined as the combination of the location property specifying the center of the circle as a 'LatLng' object and a radius, measured in meters.

A 'Places Nearby' search is initiated with a call to the 'PlacesService's' nearbySearch( ) method, which will return an array of 'PlaceResult' objects and store them as the service local object variable. The function call "nearbySearch" is executed on the service object with two parameters: "request" and "callback". The "request" parameter is defined as a local parameter defined with three elements: 'Location'—the provided location on the user's map. The latitude/longitude around which to retrieve place information; 'Radius'—the number of meters from the location that is used to determine the location area to be searched. Results inside of this region will be ranked higher than results outside of the search circle, however, prominent results from outside of the search radius may be included. And thirdly, 'Types'—the types to be searched for, which is a function which supports many different types of items to be searched for including "store". The result of the function "nearbySearch" is returned in the callback parameter, which calls the local callback function. The actual elements are returned in the results array. In this example, the "callback" function calls "createMarker" for each of the results returned and creates a map marker on the user's map for each of the stores located in the "nearbySearch" function.

The code previously shown is modified to implement the current application's logic of determining the coordinates of the next intersection in the current step of the current leg of the navigation. These coordinates are then used to seek stores at that identified intersection, and then notify the user to look for upcoming stores where the turn takes place. Code that has been added and/or modified is displayed with an altered font to assist the reader in understanding what was present, and what was added/altered.

FIG. 4 illustrates code to obtain businesses at an intersection. Referring to FIG. 4, JAVASCRIPT code 450 is illustrated that notifies the user of destinations, such as stores, at an intersection of the next turn of the current step in the current leg of the current navigation. In the initialize function, modifications are made that obtain the current leg and current step of the navigation. The current leg is the portion of the navigation the user is currently located on and is obtained by a call to "getCurrentLeg" on the service object. This is stored in a local variable, "leg". The current step of the current leg is then obtained by a call to "getCurrentStep" on the service object using the previously obtained leg. This is stored in a local variable "step". The end_Location attribute of the "step" object is used to obtain the latitude and longitude coordinates corresponding to the coordinates of the end location of the current step. A new google.maps.LatLng object is instantiated with the coordinates previously obtained and stored in a local variable, "map". The other change is the modification of the radius attribute of the local variable "request". In one example, it is modified from 500 to 80, the approximate number of meters or miles from the intersection that stores would be located. The radius is a circular area defined as the combination of the location property specifying the center of the circle as a 'LatLng' object.

The search is performed by the function "nearbySearch" called on the service object. The first parameter is "request", which was filled-in previously with the coordinates of the intersection, the radius, and the type of "store" permitting for the query to return the stores within 80 meters of the intersection. The second parameter is "callback" permitting this local function to be executed upon termination. The callback function first checks if the status was "OK", then a local variable, "place" is loaded with the first element in the results array. A notification is sent that informs the user to look for the store at the intersection, converting the text to speech via the function "speechToText( )".

In another example, additional functionality is used to examine all items in the results array. The items are compared against a list of readily recognizable stores that is either locally stored or remotely stored and the communication between the device and the remote computer may occur through messaging through the network 120.

For the second level of map assistance, the current application, or first application, seeks to provide additional navigation assistance by adding additional navigation clues that aid the user through interaction with the current navigation application, or second application being used by the user. This navigation system may be connected to the transport 14, an executing application on the user's device 12, a combination of both, or any other element in the system including the network 120, the remote server 16, and/or the database 18, or any other computer in the system containing a processor and memory.

Figure 5:
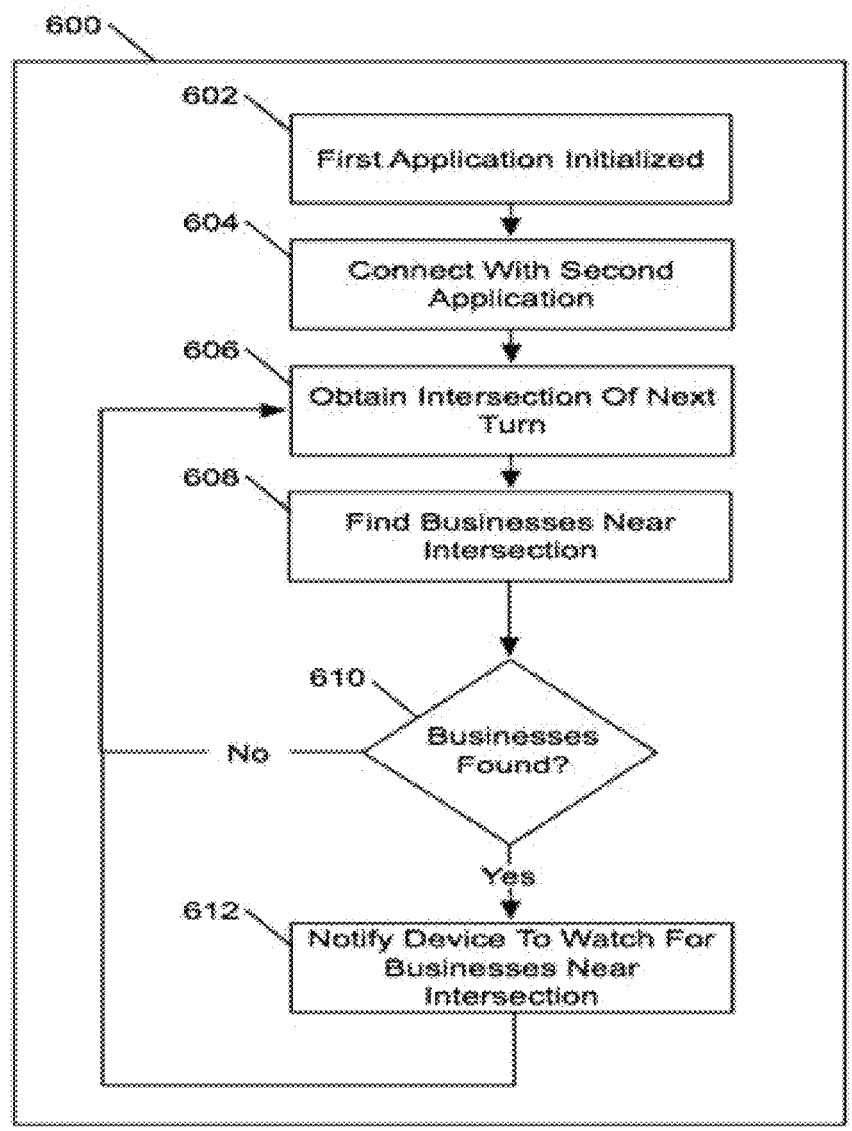
FIG. 5 illustrates a logic flow diagram of a business location identification near an intersection according to example embodiments.

FIG. 5 illustrates a logic flow obtaining the current navigation through connection with a second application, and obtaining businesses at the coordinates of the next turn in the first application in one example of the current application 600. The current application (i.e., first application) is initialized upon startup 602 and may reside on the device 12, the transport 14, or any other element in the system, or on a device (not shown) containing a processor and memory. The first application connects with a second application that is initially utilized by the user 604. This navigation system may be on the transport, or part of the transport 14 and/or on the user's device 12 which may be a mobile device. The first application may be a separate application executing on the device, or may be part of the navigation system. If the current application is not part of the current navigation system, communication between the current application and the navigation system may take place via messaging that is sent through normal wired and/or wireless connections. The first application may also interwork with the navigation system through the calling of functions on the navigation system's API where functionality may be obtained. For example, the first application may call functions on the second application to obtain the current destination, the current leg of the navigation, the current ending destination of the current leg, etc. The first application, through any of the previously described scenarios connects with the second application to obtain the details of the navigation.

As an example, the following list contains attributes that may be used to obtain navigation details where each of the attributes are on a 'NavigationInfoObject' such that the 'NavigationInfoObject' may be an object in the application executing on the current navigation application executing on the device 12 and/or the transport 14. The current application may query the navigation application, accessing the data in the 'NavigationInfoObject', and gaining the details needed to provide the navigation details. For example, certain details ma include 'arrived'—indicates if the user arrived at his destination; 'currentDirection'—the current direction of the calculated route, which includes information of the routing service, like street name, turn angle, etc.; 'distanceToDestination'—the distance to the destination in meters, 'distanceToNextDirection'—the distance to the next turn in meters; 'finalDirection'—indicates if this is the final direction of the route; 'navigation'—points to the current 'ffwdme.Navigation' instance, 'nearest'—provides information about the point on the route mapped to the raw geoposition of the client, 'nextDirection'—the next direction of the calculated route, which includes information of the routing service, such as street name, turn angle, etc.; 'position'—the position of the client mapped to the route, 'positionRaw'—the raw geoposition of the client, 'ratioCompletedDirection'—value between 0.1 and 1.0 that represents the progress on the current direction of the route; 'ratioCompletedRoute'—value between 0.1 and 1.0 that represents the progress on the current route; 'route'—the current route; 'timeToDestination'—the estimated time to the destination in seconds, 'timeToNextDirection'—the estimated time to the next direction in seconds.

Using the attributes above, it is possible to call "getter" functions on the object to obtain the current values in the object's attribute 606. For example, to obtain the next direction of the current navigation, the following code would return the current value in the "nextDirection" attribute on the NavigationInfoObject: route nextDir=navigationInfoObject.getNextDirection(route).
Once the coordinates of the ending destination of the current leg of the navigation is obtained, a call to a function that returns the businesses at or near that intersection may be called to obtain the stores that are at or near the coordinates of the intersection 608. For example, the previously described "nearbySearch" function on a PlacesObject.

The results of the nearbySearch call is examined to see if any stores were found at that intersection 610. If no businesses were found, then the logic loops back to obtain the next leg/step in the second application 606. If the result contains one or more stores at the intersection, a notification is generated that the first application will convert to speech and play for the user to be made aware of a store or stores at the intersection of the next point in the second application 612.

In another embodiment, a 3-dimensional (3D virtual and/or hologram) image is displayed on the transport along with the information of the next pertinent intersection. For example, a 3D virtual image is displayed on or proximate to the windshield of the transport and the specific displayed image/text is controlled via the controls of the transport. In one example, controls to vary the 3D display are placed on the transport, such as on the steering wheel of the transport such that the user, without having to look off the road may be able to determine the details and/or content that is displayed. Controls may be built into the steering wheel so the control of the data being displayed on the windshield is possible. For example, the display may be altered to show less or more data, such that the user is able to zoom in or out on the displayed image via controls on the steering wheel. Many other controls are possible by one skilled in hardware and software technologies and would not deviate from the scope of the current application.

Figure 6:
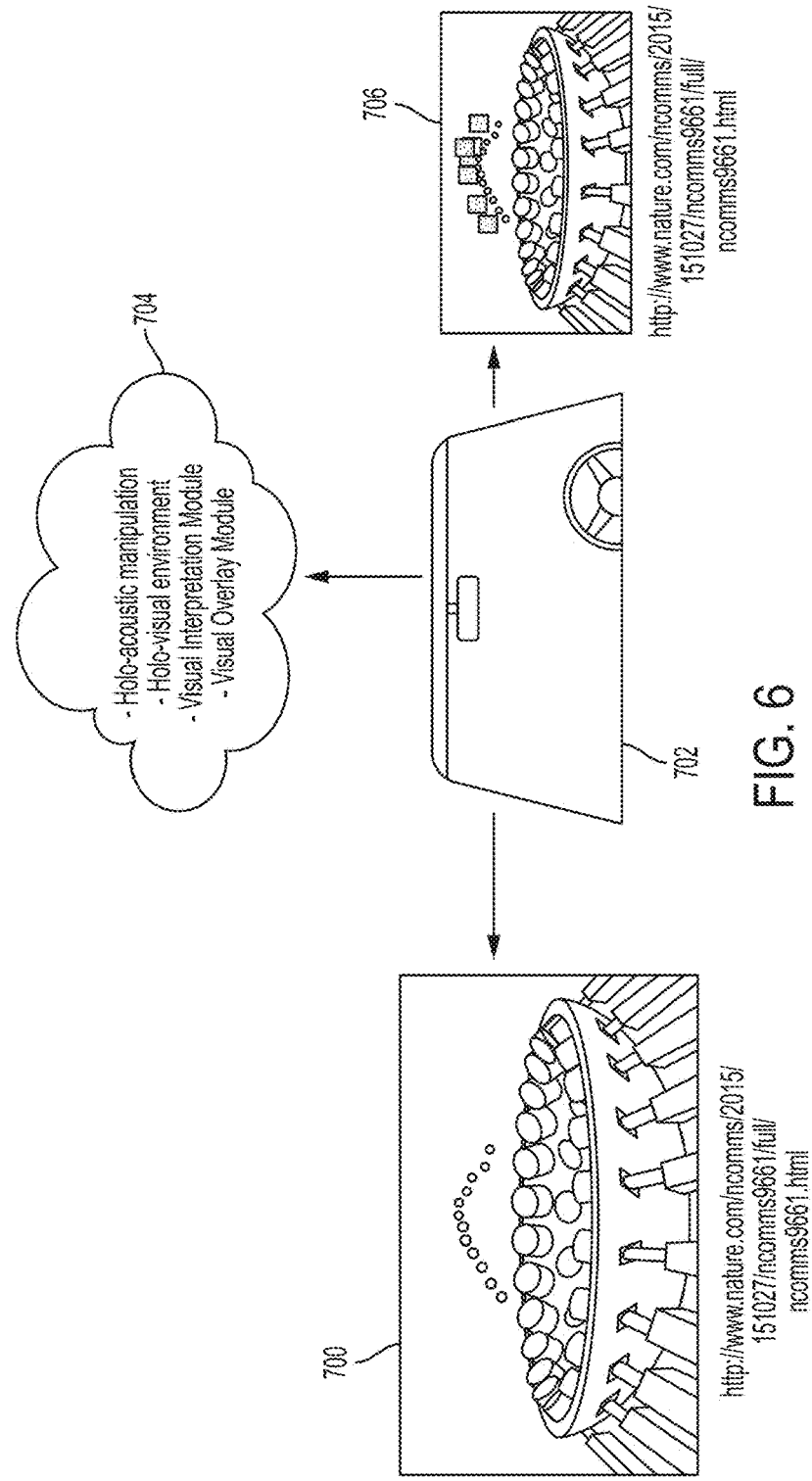
FIG. 6 illustrates a logic diagram of holo-levitation used with sound waves according to example embodiments.

FIG. 6 illustrates an object that is holo-levitated by the use of soundwaves. In this example, sound will levitate objects of different sizes and materials through air, water and tissue. This permits us to manipulate cells, liquids, compounds or living things without touching or contaminating such objects. However, acoustic levitation requires the targets to be enclosed with acoustic elements. Here, the phases are optimized to drive an ultrasonic phased array and show that acoustic levitation can be employed to translate, rotate and manipulate particles using even a single-sided emitter. Furthermore, the holographic acoustic elements framework that permits the rapid generation of traps provides a bridge between optical and acoustical trapping. Acoustic structures shaped as tweezers, twisters or bottles emerge as the optimum mechanisms for tractor beams or container-less transportation. In the example that will be shown, the table, instead of being merely a light table is a holo-acoustic table with the ability to move the object over a field and physically manipulate the object in multiple axes. The example of the present disclosure renders the use of a mere light table.

In the present example, the ability to holo-acoustically manipulate a physical object may include a three dimensional holographic overlay which moves a visual field in tandem with the holo-acoustically manipulated object. In this example, the table either moves the object according to a predetermined flight path or a user has the ability to have the table lift and manipulate the object.

The camera 702, which may be part of the transport 14, captures the present location of the physical object 700, for example a radio/navigation system in the transport, and provides the image into the cloud 704. The cloud in this example has modules, which permit the holo-acoustic manipulation of the physical object by an underlying sonic table. A holo-visual environment is appended to the physical object by a visual interpretation module and an overlay module. For example, the holo-visual representation is appended to the radio/navigation system. The physical object is provided with a holographic outline, the holographic environment is also provided with a series of holographic outlines which are not permitted to overlap. This disallowance of overlap provides the visual appearance of a solid object with a solid appendage that moves in unison with the appendage 706.

Figure 7:
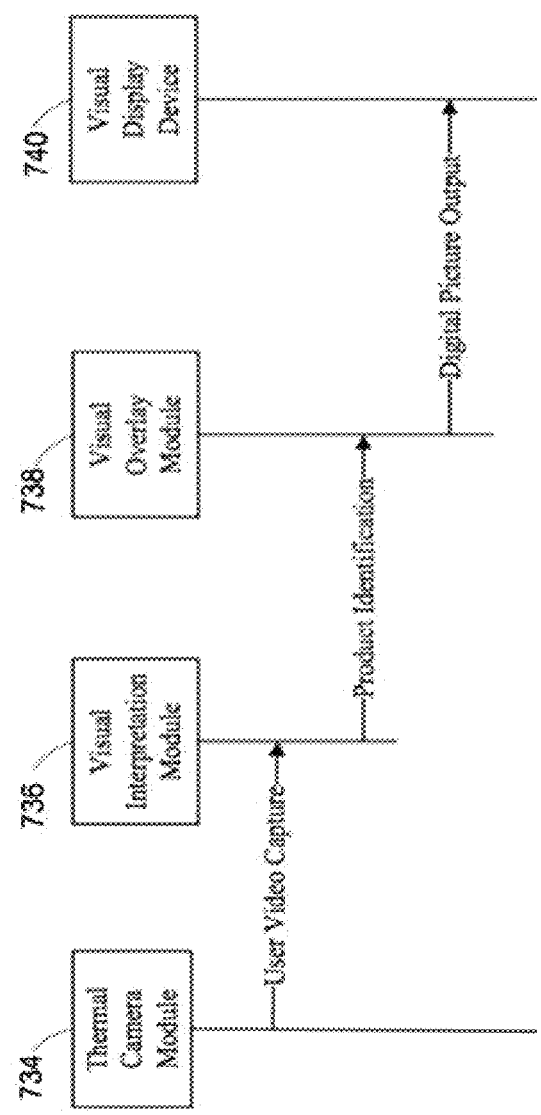
FIG. 7 illustrates a system diagram of operations performed within a holo-visual display procedure according to example embodiments.

FIG. 7 illustrates an example message flow between modules of the various server modules. The holo-acoustic manipulation module 708 manipulates the position and orientation of a physical object. A digital camera module 710 photographs the positions of the physical object 702 from the position of the observer and sends position information of the object to a holo-visual environment module 712 and position information of the observer to a visual overlay module 714. The server correlates the position of both the physical object and the observer from the data sent to the visual overlay module 714 and creates an overlapping virtual environment for the physical object that is displayed on the windshield 716.

Figure 8:
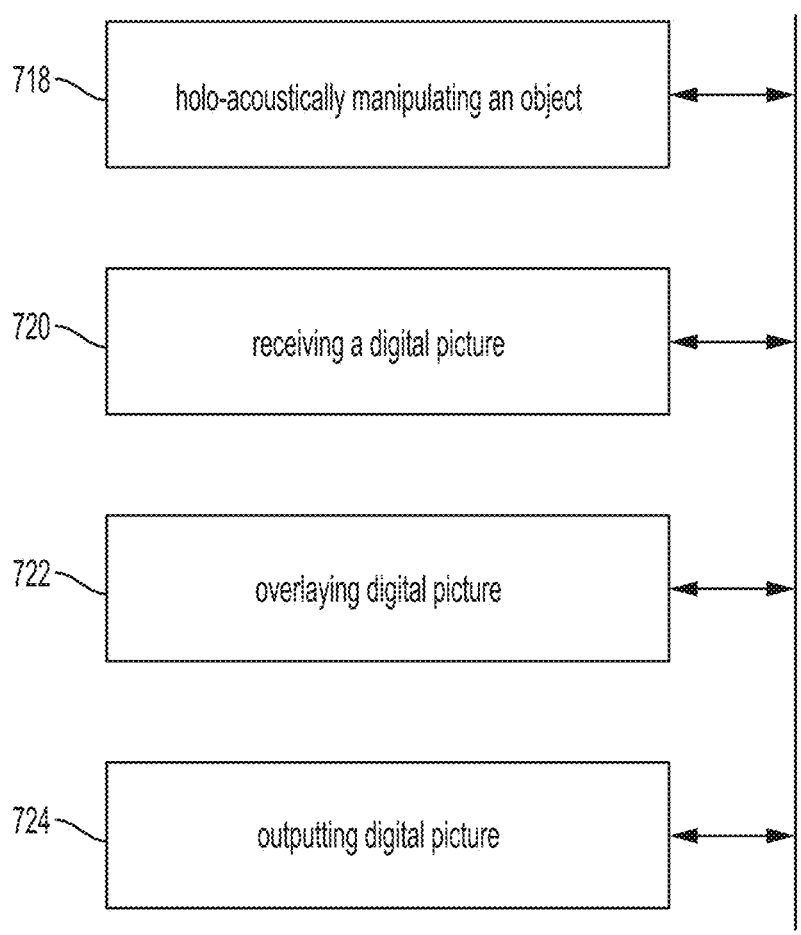
FIG. 8 illustrates a flow diagram example method of holo-levitation based on soundwaves according to example embodiments.

FIG. 8 illustrates an example method of holo-levitation according to example embodiments. The method includes holo-acoustically manipulating 718 a physical object 700 by receiving 720 a digital picture from the object camera located on the glass surface 720. The virtual environment is overlaid 722 onto the physical object 700 taking into account the relative position of the physical object 700 and the observer. A video signal is outputted 724 to the surface 702 so an interactive environment appears between the physical object 700 and the virtual environment. In one example, the system 10, utilizing holo-levitation, levitates visual information such as virtual, holograms, electronic, etc., data instead of physical objects. For example, one or more elements in the system 10, such as, device 12 and/or transport 14, includes a microphone, receiver, and/or any device including a processor and memory capable of receiving and/or processing audio. The device 12 and/or the transport 14 includes functionality that equates the received and/or processed audio to the visual information and presents such visual information to one or more users.

In a further example, one or more elements in the system 10, such as device 12 and/or transport 14, include a microphone, receiver, and/or any device including a processor and memory capable of receiving and/or processing audio. The device 12 and/or the transport 14 include functionality that equates the received and/or processed audio to the visual information and presents such visual information to one or more drivers and/or passengers in a regular and/or autonomous transport. For example, based on a route to a destination, a navigation system and/or navigation functionality (not shown), herein referred to as navigation system, operating on or accessed via the device 12 and/or the transport 14 announces: "Turn right on Main Street."

For example, the navigation system and/or navigation functionality can provide such audio queues every few seconds/minutes/etc. The functionality of the device 12 and/or the transport 14 parses the announcement and determines the action word/phrase "right" and location word/phrase "Main". The holo-levitation functionality is incorporated in the device 12 and/or the transport 14, such as on the steering wheel and/or the dashboard. In one embodiment, the functionality of the device 12 and/or the transport 14 and the holo-levitation functionality are the same functionality (i.e. the same product, application, etc.). In another example, the functionality of the device 12 and/or the transport 14 and the holo-levitation functionality are separate.

The functionality and/or the holo-levitation functionality "floats" the visual representation of the word "Right" and the words "Main street". In another embodiment, symbols can be used with or in place of these words, such as a right arrow and a street sign. These visual representations are seen "floating" over the dash, or at a location easily viewable by the driver and/or passenger of the transport and the user may interact with the floating representation through touch and/or gestures. In one example, the visual representation floats over the dash such that the driver is able to view/see through the floating representation (virtual) and the view outside the transport (physical) simultaneously. In another example, via the holo-levitation functionality and/or the functionality of the device 12 and/or the transport 14, the virtual representations can be modified. For example, as the transport is approaching Main Street, the word "Right" and/or the right-arrow symbol can begin to flash, enlarge, etc.

In one possible implementation of the current application, controls are built into the transport, permitting for the control of a display. For example, 702, which is the windshield of the transport. For example, the navigation system uses audio to announce the upcoming turn, which may be, for example: "Turn right in 800 yards". The current application on the device 12 and/or a processor on the transport 14 then displays a visual of the upcoming intersection on the transport display, for example a heads-up display (HUD) and an image is displayed on the windshield such that the driver may still be able to see through the windshield and the image is lightly displayed proximate to the window so that the user may see both the image and the outside of the transport. The image can also be displayed on a display in the vehicle.

In another embodiment, a halo-acoustic image is created on the display of the transport, such as the windshield where an image 3D image is displayed in a viewing area of the driver such that the user may be able to clearly see outside the window, and yet still see the 3D hologram image. A device, such as a holographic processing unit 520 generates an image through a multiplicity of sensors. This holographic processing unit utilizes the sensors to manipulate a physical object reflecting an image that is fed into the device creating a holographic image. The image may be an image of the upcoming intersection and the data for the image may be from an on-site camera, or an image from the cloud/network 120, such as street view from an online mapping application.

Figure 9:
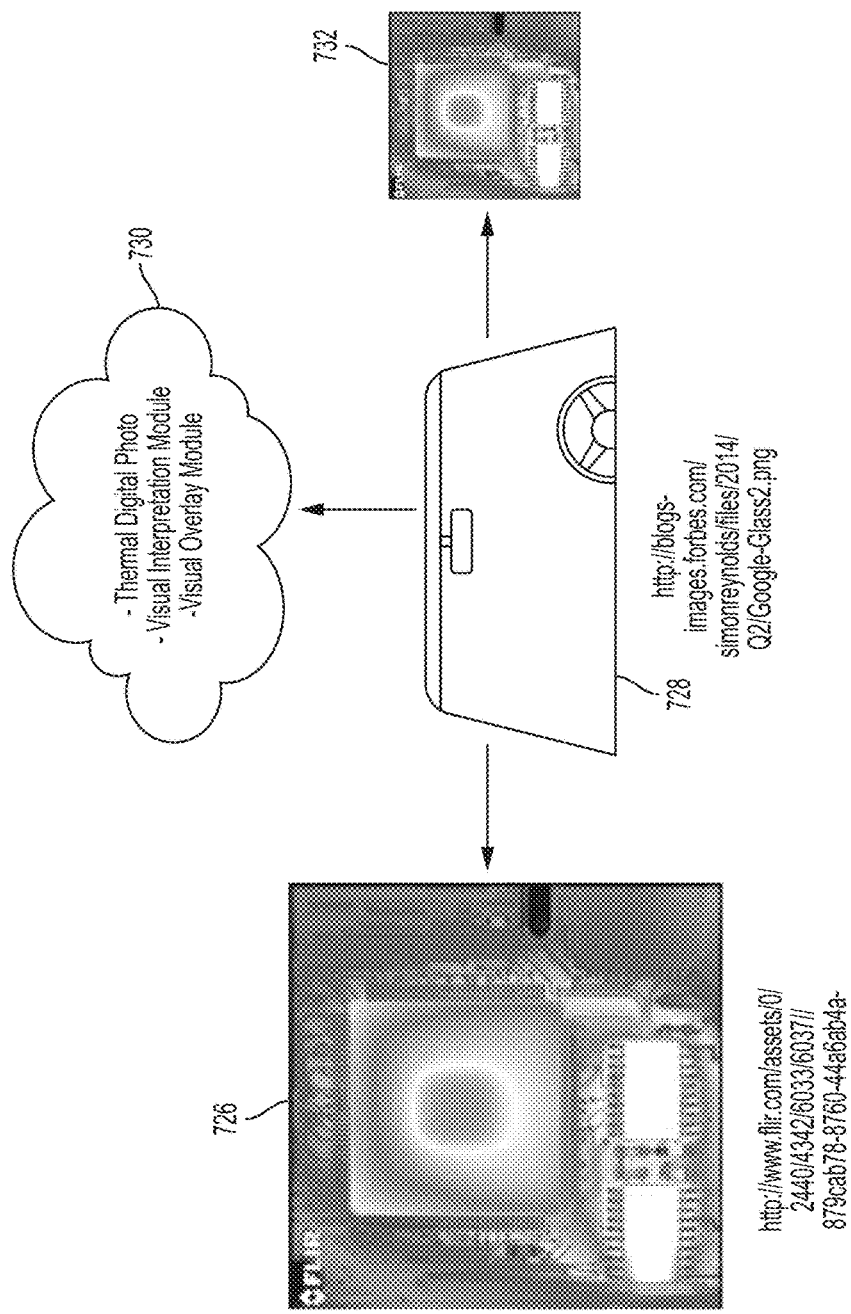
FIG. 9 illustrates a thermal digital photo procedure according to example embodiments.

FIG. 9 depicts an IT thermal view in which an image or object, for example, a number of computer components 726 are sensed and analyzed. In this example, a user has the ability to remotely determine the state of health of components based on a current temperature in the context of a historical temperature. The ability to view ailing components virtually saves time and makes positive identifications of what and where the component is located. This type of view permits almost a technical omniscience of the device being viewed. In one example, components of the vehicle may be viewed by the system and the user may be able to detect heat-related issues to be made aware of issues before a breakdown occurs.

The detection of issues also permits the system to provide the user by a holo-library at least one repair method. The holo-library is a virtual library of various repair techniques. The holo-library permits the repair technique to be mapped onto a device to show the user how to perform the repair. In this example the data is input from a thermal digital photograph taken by the digital glasses 728 and uploaded to the cloud 730. Within the cloud 730 are the following modules 732, a thermal digital camera module, visual interpretation module and visual overlay module.

Figure 10:
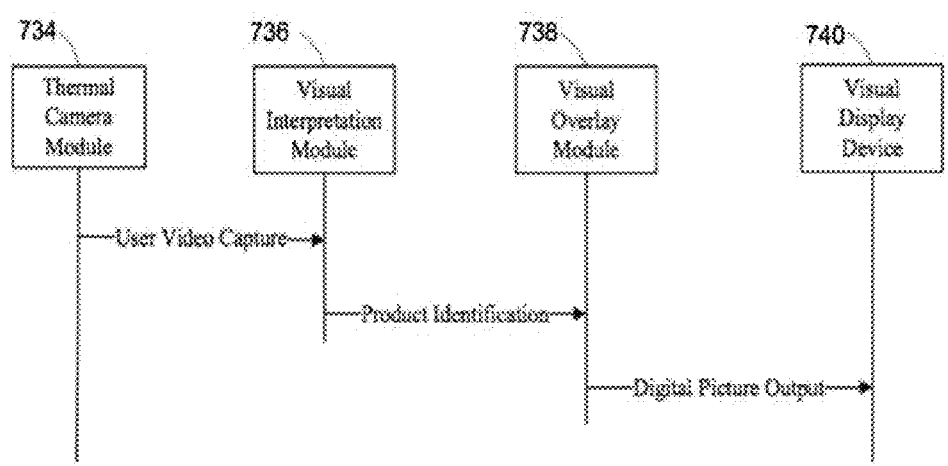
FIG. 10 illustrates another system diagram of a message flow during a visual processing operation according to example embodiments.

The video input of the computer from the digital camera 728 is stored in the cloud 730 along with the visual interpretation module and the visual overlay module. FIG. 10 depicts a message flow diagram where the thermal digital camera module 734 (728) captures and forwards a digital picture to a visual interpretation module 736, which may be kept in the cloud (730). The high temperature components are forwarded to a visual overlay module 738, which is also stored in the cloud (730) and outputs a picture to the visual display device 740 in this example.

Figure 11:
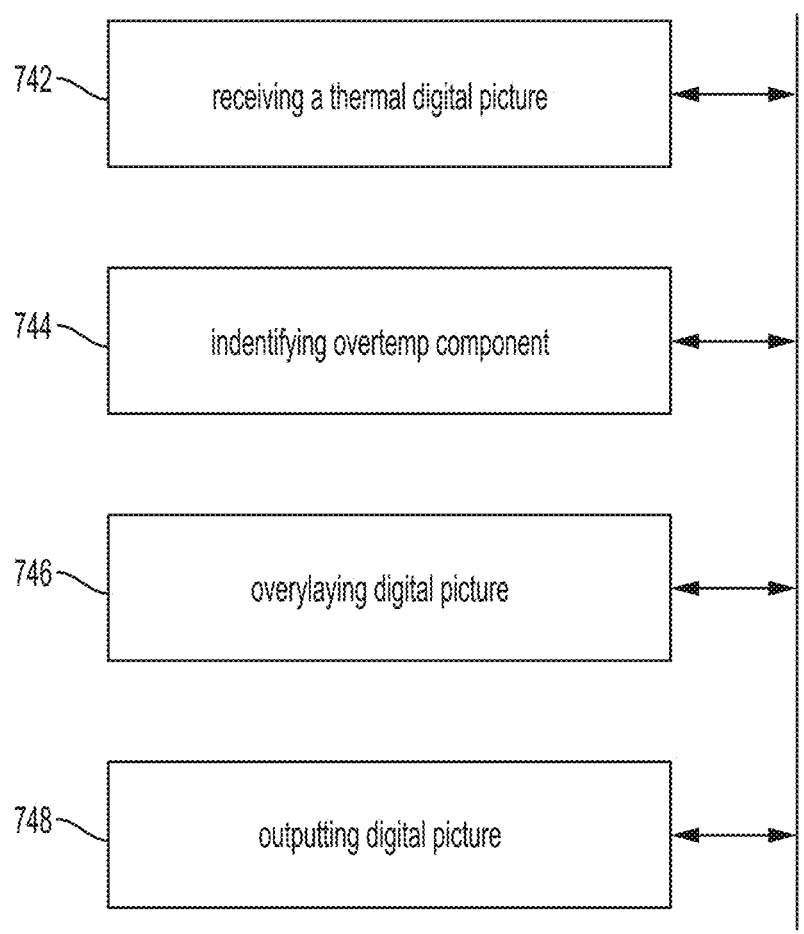
FIG. 11 illustrates a flow diagram of digital picture overlaying according to example embodiments.

FIG. 11 depicts receiving 742 a digital picture from the thermal digital camera module (734), identifying 744 the over-temp component using the visual interpretation module (736), overlaying 746 using the visual overlay module (738) the thermal digital picture on the environment and outputting 748 the thermal digital picture to the display device (728). In one example embodiment the system identifies probable faulty components of the transport. When a high temperature component is selected, a box illuminates around the component to show its location and indicate how the issue may be corrected, such as replacing the component, providing instructions to the component, etc.

Additionally, in another example the system may provide a step-by-step procedure on how to replace the item, if the user desires to learn how to do so. In this example, it is not necessary to restrict the physical object to being laid upon a table, the component may be analyzed and repaired in place, which is of benefit in the information technology field. The use of detecting thermal data from a thermal digital photo is discussed so the use of viewing thermal data on a display in a transport becomes useful for decision making. For example, data from a thermal digital camera is taken and uploaded to the cloud/network 120 and the transport 14, coupled to the network, may access and obtain the data. Using the technology located in the transport 14, such as a visual interpretation module and visual overlay module 730, the thermal image is processed by the transport 728.

The thermal image is then displayed on the transport 728 which may include displaying the image on the windshield such that the user may be able to view the image on the windshield and look through the windshield at the same time. The thermal data may assist in determining issues with other devices in the transport, such as smart phones, wearables, tablets, etc. The phrase "navigation system" as used herein can mean a navigation system and/or navigation functionality contained and/or accessed by one or more of the elements in the system 10, such as the device 12 and/or the transport 14.

As an example, the user of the current application is driving a transport 14. The transport's navigation system is currently navigating the transport to a determined final destination. An announcement is heard from the transport's navigation system: "Turn right in 800 feet." The current application, executing on either the user's device 12 or the transport 14 processes the audio that is played and adds a supplemental announcement following the announcement: "There is a Chevron Gas Station on the corner". In addition, a holo-visual representation of the combined audio is displayed as a floating representation over the dash of the transport.

For autonomous (self-driving) vehicles, which will become more prevalent in the automobile market, functionality disclosed in the current system 10 permits for the system to obtain an understanding of the riders in the transport. This understanding includes the number of riders, the ranking or hierarchy of the riders, and enables an overriding of the ranking or hierarchy of the riders based on specific inputs to the transport from the riders. With the ability for the autonomous vehicles to be driven without any or limited human interaction, it may become necessary for the rider(s) to provide input to the transport. For example, a destination and/or alternate directions may be input to the transport to navigate to a desired location. What is necessary is the need to enable the riders to input requests to the transport whether it is verbal, physical, gestures, text, or other types of input, so the input received is a command that is originated from a rider that has the right to provide the direction information. This implementation may enable the transport to react to commands that are necessary and appropriate, and avoid commands that are not appropriate.

The system 10 may determine the number of total riders in the transport 14, then may determine the ranking of the riders based on functionality criterion, and finally may determine override features for actions related to the riders. To determine the total number of riders, the transport calculates the number of riders in the transport by functionality built-into the transport, such as measuring the amount of weight on each of the seats in the transport. It may also utilize a camera and/or sensor inside the transport to capture an image or video and the number of riders may be determined. In determining the ranking of the riders, the system 10 allocates a ranking of each of the riders in the transport based on an age of the riders, an owner of the transport, a request to the transport, a time of the request, etc. Further, audio can be captured from a microphone and the like on the transport 14 and/or the device 12. The analysis of the captured audio assists the transport in determining the ranking of the riders. The location of the riders providing the requests may further be determined by capturing video from a camera inside the transport, and the system 10 may then correlate the captured audio with the rider in a specific location in the transport.

Further analysis of the captured audio may then determine the approximate age of each of the riders in the transport. This may be determined by the processing of the audio, such as provided by CMU SPHINX, a leading open-source speech recognizer. The system 10 may then be able to gain an understanding of which riders are more mature, such as which riders are older and thus more responsible. Further, the analysis can determine if a rider providing a request is slurring their words or otherwise sounds intoxicated or partially incapacitated. The transport would then react to commands received from the one or more riders that are ranked highest. The transport assigns a rank to the riders permitting the system to determine the ranking order for received input.

Figure 12:
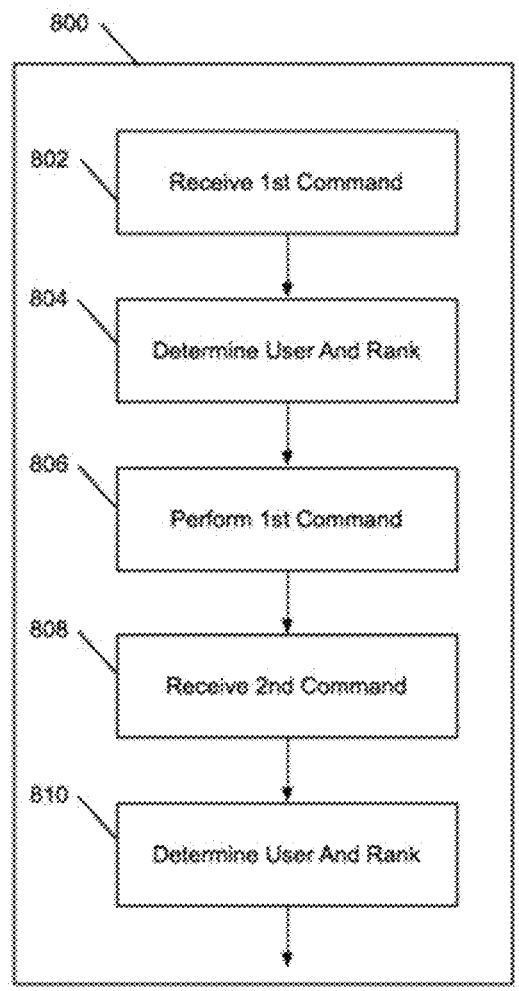
FIG. 12 illustrates a flowchart for processing commands according to example embodiments.

FIG. 12 is another flowchart 800 in one possible implementation of a command input and processing configuration according to example embodiments. A first command may be received by the transport 14 via audio data received from a rider 802 of the transport. The system determines the user and/or rank of the rider 804 that has submitted the first command, for example, a command spoken to the transport that is received by a microphone in the transport. The command is stored either locally at the transport 14, or remotely in the cloud/Internet 120. The transport processes the command 806 if the command is deemed a safe command by one or more elements of system 10. If the command is deemed not to be safe, for example a request to speed, swerve, break in an improper manner, the command is ignored and optionally a reason is provided to the rider(s).

Next, a second command is received by the transport 14 via data received, such as from audio of a rider 808. The system determines the user and/or rank of the rider 810 whom has submitted a second command, for example, spoken a command to the transport that is received by a microphone in the transport. The command is stored either locally at the transport 14, or remotely in the cloud/Internet 120.

When processing commands from the riders of the transport, it may be necessary for the transport to react to commands that are not received from the higher ranked riders. The transport 14 may match the received audio from the rider(s) and each received command is matched against a list of commands that would override the ranking of the riders. This list is stored in one or more of the elements in the system 10, and received commands are compared against the list of overriding commands. For example, some commands that may cause an override are: "Take me to a hospital", "There has been an accident", or other similar, emergency-type commands. One versed in programming techniques and the nature of autonomous vehicles may be able to add to the list of overriding commands without deviating from the scope of the current application.

Figure 13:
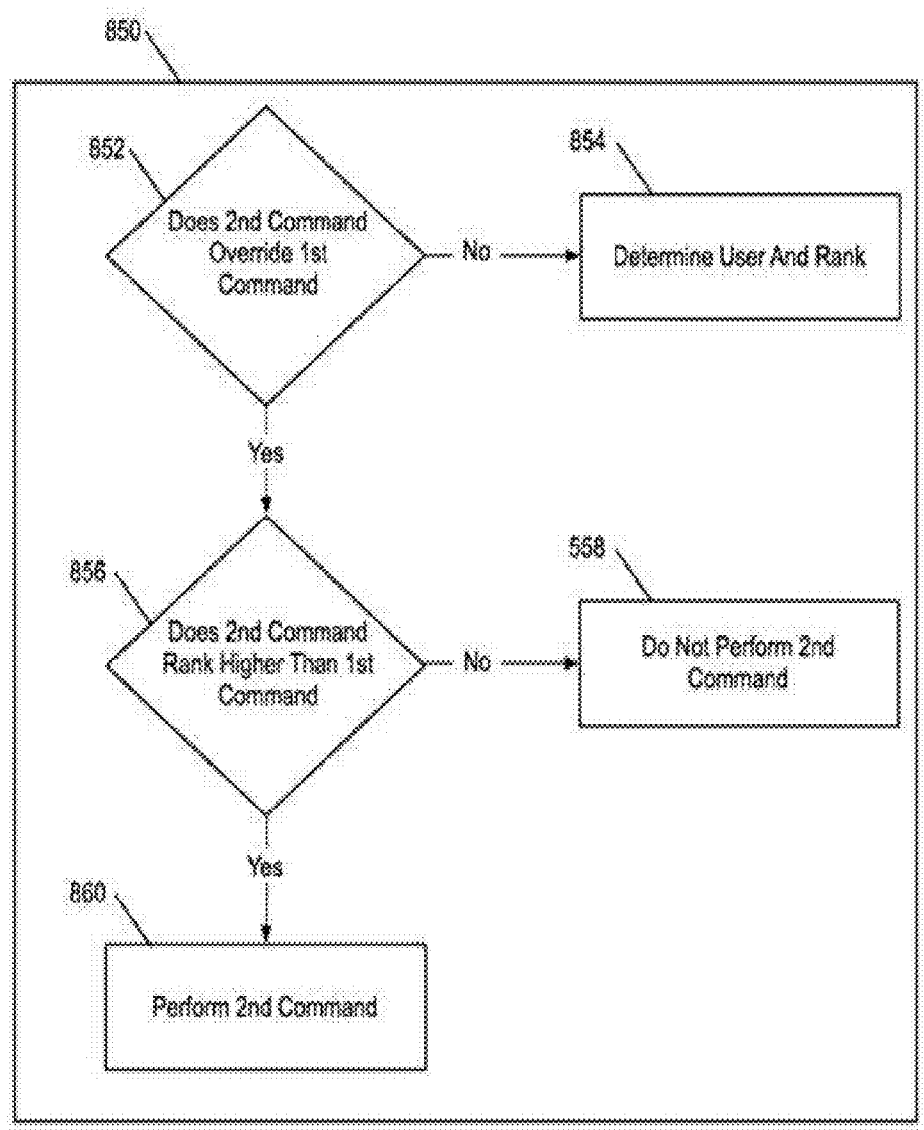
FIG. 13 illustrates a flowchart for command navigation according to example embodiments.

FIG. 13 is another flowchart of processing commands 850 in one possible implementation of the example embodiments. Referring to FIG. 13, the current transport 14, in one embodiment, checks to determine whether a command overrides a previous accepted command 852. For example, a check is performed when a received command negates a previously accepted command or otherwise causes an unsafe situation for the transport. If the second command does not override a first received command, the transport determines which of the riders submitted the command and either obtains the rank of the user, or determines the rank of the user 854. If the user's rank of the 2nd command exceeds the user's rank of the first command 856 then the 2nd command is performed 860 and if not, the 2nd command is ignored 558.

Figure 14:
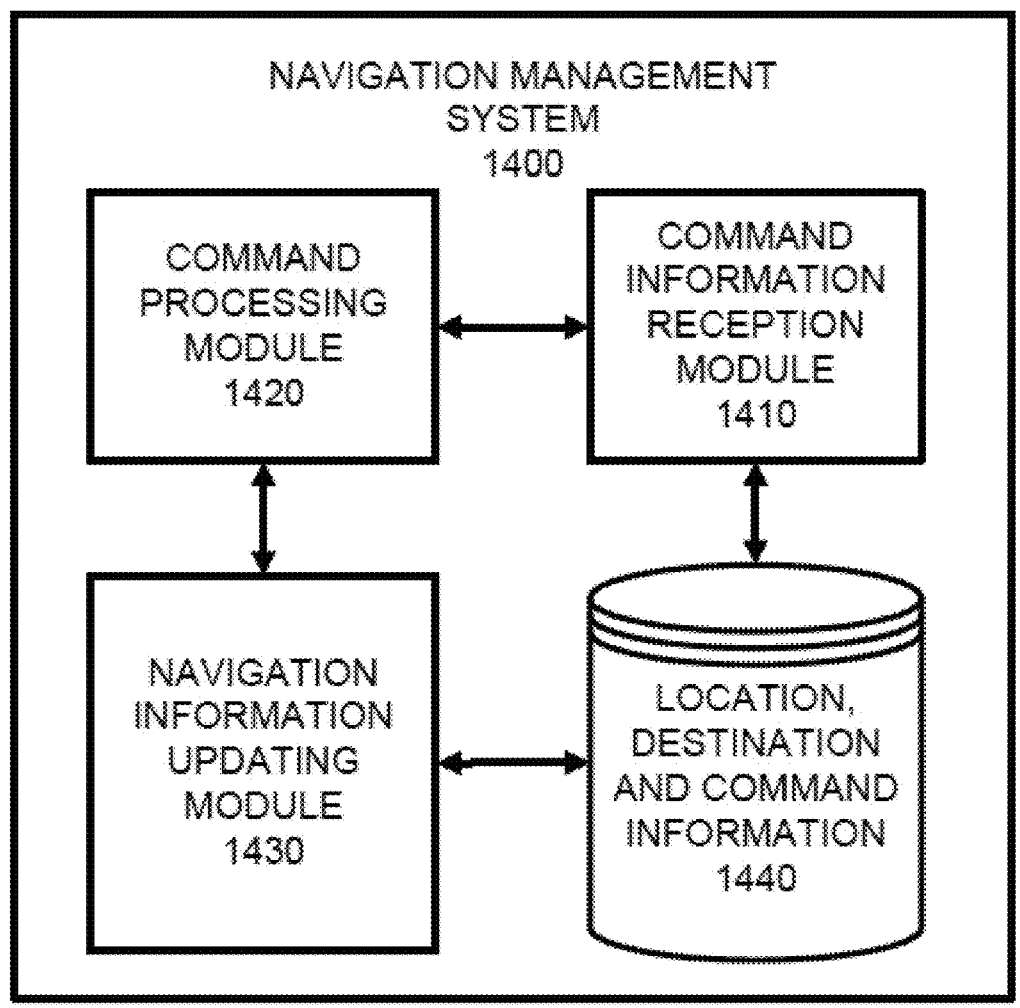
FIG. 14 illustrates a system configuration configured to perform one or more of the example embodiments of the present application.

FIG. 14 illustrates a system configuration 1400 of a computer, server or set of computing devices. The system may be used to identify navigation routes based on received input data. One example method of operation may include receiving location and destination information via the information and command reception module 1410. The command and location processing module 1420 may include a computing unit or device that compares the location and user characteristic data to a predefined condition stored in memory. The system also includes determining whether the user characteristics can be used to match an intermediate location via the location and command update module 1430. All information received and used to process such determinations may be stored in the information database 1440.

One example method of operation provided by system 1400 may include a method that includes providing at least one navigation instruction to a navigation device via a navigation application and via the information reception module 1410. The method may also include detecting the at least one instruction via a detection application and via the processing module 1420, and providing at least one additional navigation instruction including additional information related to the first navigation instructions via the detection application via the update module 1430.

The navigation instruction includes at least one of an audio command and a display command on a user interface of the navigation device. The method may also include identifying the at least one navigation instruction as an audio command, processing the audio command to identify a present location via the detection application, and identifying at least one object within a predefined distance of the present location. The at least one additional navigation instruction includes the at least one object. Also, the at least one additional navigation instruction could also include an audio command. The at least one additional navigation instruction includes a visual command. The method may also include identifying at least one prompt from the audio command via the detection application, and creating the at least one additional navigation instruction based on the at least one prompt, and the at least one prompt includes an audio command to turn at an upcoming intersection.

Another example may include a method that includes providing at least one navigation instruction to a navigation device via a navigation application, detecting the at least one instruction via a detection application, obtaining an image of a physical object, performing a holo-acoustic object manipulation of the physical object, and providing a visual display of the holo-acoustic manipulation as an additional navigation instruction. The at least one navigation instruction includes at least one of an audio command and a display command on a user interface of the navigation device. The method may also include identifying the at least one navigation instruction as an audio command, obtaining a photograph of the object responsive to identifying the at least one navigation instruction, and obtaining position information of the object from the photograph. The method may also include correlating the position information of the object and position information of the observer. The method may also include providing the position information of the object and the position information of the observer to a video overlay module, and creating an overlapping virtual environment hologram for the physical object. The method also provides displaying the overlapping virtual environment hologram on a windshield via a projector. The overlapping virtual environment includes a business location being overlaid into an area of an upcoming intersection.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 15 illustrates an example network element 1500, which may represent any of the above-described network components, etc.

Figure 15:
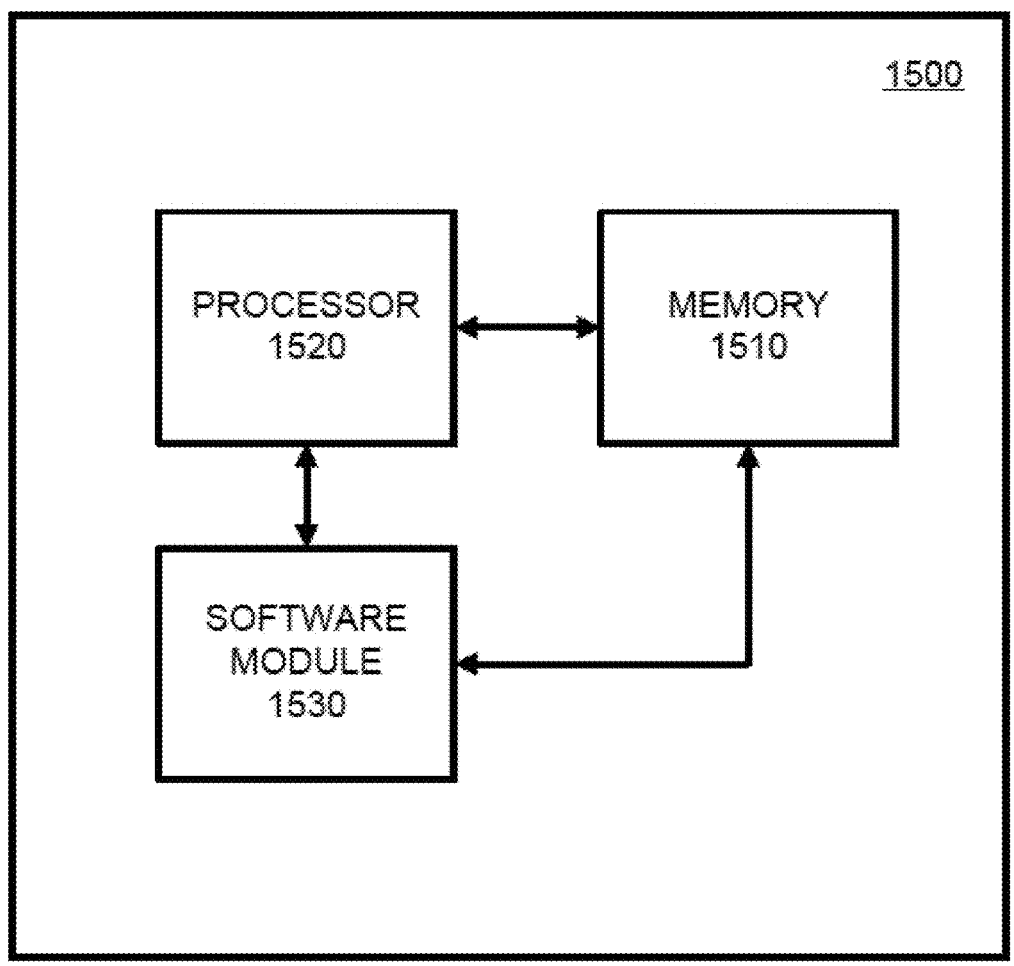
FIG. 15 illustrates an example network entity device configured to store instructions, software, and corresponding

As illustrated in FIG. 15, a memory 1510 and a processor 1520 may be discrete components of the network entity 1500 that are used to execute an application or set of operations. The application may be coded in software in a computer language understood by the processor 1520, and stored in a computer readable medium, such as, the memory 1510. The computer readable medium may be a non-transitory computer readable medium that includes tangible hardware components in addition to software stored in memory. Furthermore, a software module 1530 may be another discrete entity that is part of the network entity 1500, and which contains software instructions that may be executed by the processor 1520. In addition to the above noted components of the network entity 1500, the network entity 1500 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 14 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of:

a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   providing at least one navigation instruction to a navigation device via a navigation application;
   detecting the at least one instruction via a detection application;
   obtaining an image of a physical object;
   performing a holo-acoustic object manipulation of the physical object; and
   providing a visual display of the holo-acoustic manipulation as an additional navigation instruction.

2. The method of claim 1, wherein the at least one navigation instruction comprises at least one of an audio command and a display command on a user interface of the navigation device.

3. The method of claim 1, further comprising:
   identifying the at least one navigation instruction as an audio command;
   obtaining a photograph of the object responsive to identifying the at least one navigation instruction; and
   obtaining position information of the object from the photograph.

4. The method of claim 3, further comprising:
   correlating the position information of the object and position information of the observer.

5. The method of claim 4, further comprising:
   providing the position information of the object and the position information of the observer to a video overlay module; and
   creating an overlapping virtual environment hologram for the physical object.

6. The method of claim 5, further comprising:
   displaying the overlapping virtual environment hologram on a windshield via a projector.

7. The method of claim 6, wherein the overlapping virtual environment comprises a business location being overlaid into an area of an upcoming intersection.

8. An apparatus, comprising:
   a processor configured to
   provide at least one navigation instruction to a navigation device via a navigation application,
   detect the at least one instruction via a detection application,
   obtain an image of a physical object;
   perform a holo-acoustic object manipulation of the physical object, and
   provide a visual display of the holo-acoustic manipulation as an additional navigation instruction.

9. The apparatus of claim 8, wherein the at least one navigation instruction comprises at least one of an audio command and a display command on a user interface of the navigation device.

10. The apparatus of claim 8, wherein the processor is further configured to identify the at least one navigation instruction as an audio command,
obtain a photograph of the object responsive to identifying the at least one navigation instruction, and
obtain position information of the object from the photograph.

11. The apparatus of claim 10, wherein the processor is further configured to
correlate the position information of the object and position information of the observer.

12. The apparatus of claim 11, wherein the processor is further configured to
provide the position information of the object and the position information of the observer to a video overlay module, and
create an overlapping virtual environment hologram for the physical object.

13. The apparatus of claim 12, wherein the processor is further configured to
display the overlapping virtual environment hologram on a windshield via a projector.

14. The apparatus of claim 13, wherein the overlapping virtual environment comprises a business location being overlaid into an area of an upcoming intersection.

15. A non-transitory computer readable storage medium configured to store instructions that when executed causes a processor to perform:
providing at least one navigation instruction to a navigation device via a navigation application;
detecting the at least one instruction via a detection application;
obtaining an image of a physical object;
performing a holo-acoustic object manipulation of the physical object; and
providing a visual display of the holo-acoustic manipulation as an additional navigation instruction.

16. The non-transitory computer readable storage medium of claim 15, wherein the at least one navigation instruction comprises at least one of an audio command and a display command on a user interface of the navigation device.

17. The non-transitory computer readable storage medium of claim 15, wherein the processor is further configured to perform:
identifying the at least one navigation instruction as an audio command;
obtaining a photograph of the object responsive to identifying the at least one navigation instruction; and
obtaining position information of the object from the photograph.

18. The non-transitory computer readable storage medium of claim 17, wherein the processor is further configured to perform:
correlating the position information of the object and position information of the observer.

19. The non-transitory computer readable storage medium of claim 18, wherein the processor is further configured to perform:
providing the position information of the object and the position information of the observer to a video overlay module; and
creating an overlapping virtual environment hologram for the physical object.

20. The non-transitory computer readable storage medium of claim 19, wherein the processor is further configured to perform:
displaying the overlapping virtual environment hologram on a windshield via a projector, wherein the overlapping virtual environment comprises a business location being overlaid into an area of an upcoming intersection.

* * * * *